United States Patent
Winters et al.

(10) Patent No.: US 11,721,993 B1
(45) Date of Patent: Aug. 8, 2023

(54) BATTERY MANAGEMENT SYSTEM

(71) Applicant: Frederick Winters, New Berlin, NY (US)

(72) Inventors: Frederick Winters, New Berlin, NY (US); Ronald A. Johnson, Las Vegas, NV (US)

(73) Assignee: Frederick Winters, New Berlin, NY (US)

( * ) Notice: Subject to any disclaimer, the term of this patent is extended or adjusted under 35 U.S.C. 154(b) by 7 days.

(21) Appl. No.: 17/489,303

(22) Filed: Sep. 29, 2021

Related U.S. Application Data

(63) Continuation of application No. 16/527,907, filed on Jul. 31, 2019, now Pat. No. 11,218,005.

(51) Int. Cl.
| | |
|---|---|
| *H02J 7/00* | (2006.01) |
| *H01M 10/00* | (2006.01) |
| *H01M 10/48* | (2006.01) |
| *H01M 10/42* | (2006.01) |

(52) U.S. Cl.
CPC ......... *H02J 7/0047* (2013.01); *H01M 10/482* (2013.01); *H01M 10/486* (2013.01); *H01M 2010/4271* (2013.01); *H02J 7/00302* (2020.01)

(58) Field of Classification Search
CPC .. H02J 7/0021; H02J 7/00302; H01M 10/482; H01M 10/486; H01M 2010/4271
See application file for complete search history.

(56) References Cited

U.S. PATENT DOCUMENTS

| | | | |
|---|---|---|---|
| 6,031,354 A | 2/2000 | Wiley et al. | |
| 8,952,663 B2 | 2/2015 | Okuda et al. | |
| 9,184,603 B2 | 11/2015 | Lee | |
| 9,812,869 B2 | 11/2017 | Narla | |
| 9,923,399 B2 | 3/2018 | Camp et al. | |
| 10,305,293 B2* | 5/2019 | Hofer | G01N 21/25 |
| 10,328,805 B1 | 6/2019 | Wyrobek et al. | |
| 10,355,496 B1 | 7/2019 | Furman et al. | |
| 11,218,005 B2* | 1/2022 | Winters | H02J 7/0048 |
| 2003/0222619 A1 | 12/2003 | Formenti et al. | |
| 2005/0084745 A1* | 4/2005 | Colello | H01M 8/04679 700/297 |
| 2007/0182377 A1 | 8/2007 | Vandensande | |

(Continued)

*Primary Examiner* — Nghia M Doan
(74) *Attorney, Agent, or Firm* — Terry M. Sanks, Esq.; Beusse Sanks, PLLC

(57) ABSTRACT

Embodiments of the disclosure provide a battery management system (BMS) including: a first controller monitoring a first battery cell array having at least one battery cell and configured to measure an operating parameter of the first battery cell array; and a second controller monitoring a second battery cell array having at least one battery cell and configured to measure an operating parameter of the second battery cell array, and communicatively coupled to the first controller. The first controller is selectable between: an active mode for receiving the measured operating parameter of the second battery cell array from the second controller, and detecting a fault in the first or the second battery cell array based upon the measured operating parameters thereof, and a passive mode for measuring the operating parameter of the first battery cell array, and transmitting the measured operating parameter to the second controller.

20 Claims, 5 Drawing Sheets

(56) References Cited

U.S. PATENT DOCUMENTS

| | | | |
|---|---|---|---|
| 2011/0316483 A1* | 12/2011 | Zhang | H01M 10/486 320/118 |
| 2019/0081656 A1 | 3/2019 | Ekambaram et al. | |
| 2019/0165584 A1 | 5/2019 | Laflaquiere et al. | |

* cited by examiner

BATTERY MANAGEMENT SYSTEM

BACKGROUND

1. Technical Field

The present disclosure provides a battery management system and related operational methodologies.

2. Background Art

In various applications, electrical power may be delivered to a site by way of a battery array, e.g., a battery pack, a battery stack, or other arrangement of batteries in large numbers. Such battery arrays may be governed by a battery management system (BMS). A BMS for large battery arrays may be provided as a mass-produced, non-customized system board without regard to the size of the battery array. Before deployment, conventional BMS installations require substantial user reprogramming. Such reprogramming may introduce issues related to the underlying difficulty of reprogramming the BMS. BMS units are generally designed to work with multiple battery cell chemistries. Each battery cell chemistry may affect several variables of the BMS unit, which in turn makes each unit difficult to correctly program. Many conventional systems require one series chain of cell controllers to accumulate the data for all battery cells in a given array, which in turn may cause propagation delays in the interconnected cell controllers. Such delays may further lead to communication errors between various parts of the battery array, and impede performance of the system.

SUMMARY

The illustrative aspects of the present disclosure are designed to solve the problems herein described and/or other problems not discussed.

A first aspect of the disclosure provides a battery management system (BMS) including: a first controller monitoring a first battery cell array having at least one battery cell and configured to measure an operating parameter of the first battery cell array; and a second controller monitoring a second battery cell array having at least one battery cell and configured to measure an operating parameter of the second battery cell array, and communicatively coupled to the first controller, wherein the first controller is selectable between: an active mode for receiving the measured operating parameter of the second battery cell array from the second controller, detecting a fault in the first or the second battery cell array based upon the measured operating parameters thereof, and adjusting an operation of the first or second battery cell array, and a passive mode for measuring the operating parameter of the first battery cell array, and transmitting the measured operating parameter to the second controller.

A second aspect of the disclosure provides a method including: coupling a first controller for monitoring a first battery cell array to a second controller for monitoring an operating parameter of a second battery cell array, each battery cell array having at least one battery cell; causing the first controller to perform actions including: measuring an operating parameter of the first battery cell array, receiving a measurement of the operating parameter of the second battery cell array from the second controller, detecting a fault within the first or second battery cell array based on the operating parameter of the first and second battery cell array, and adjusting an operation of the first or second battery cell array; and causing the second controller to perform actions including: measuring the operating parameter of the second battery cell array, and transmitting the measurement of the operating parameter of the second battery cell array to the first controller.

A third aspect of the disclosure provides a battery management system (BMS) for a plurality of battery cell arrays electrically coupled to each other and each having at least one battery cell, the BMS including: a plurality of controllers for monitoring a respective one of the plurality of battery cell arrays, wherein each of the plurality of controller is selectable between: an active mode for measuring the operating parameter of the respective one of the plurality of battery cell arrays, receiving a measurement of the operating parameter from at least one controller of the plurality of controllers, detecting a fault in the plurality of battery cell arrays based upon the measured operating parameters thereof, and adjusting an operation of one of the plurality of battery cell arrays, and a passive mode for measuring the operating parameter of the respective one of the plurality of battery cell arrays, and transmitting the measured operating parameter to at least one controller of the plurality of controllers.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
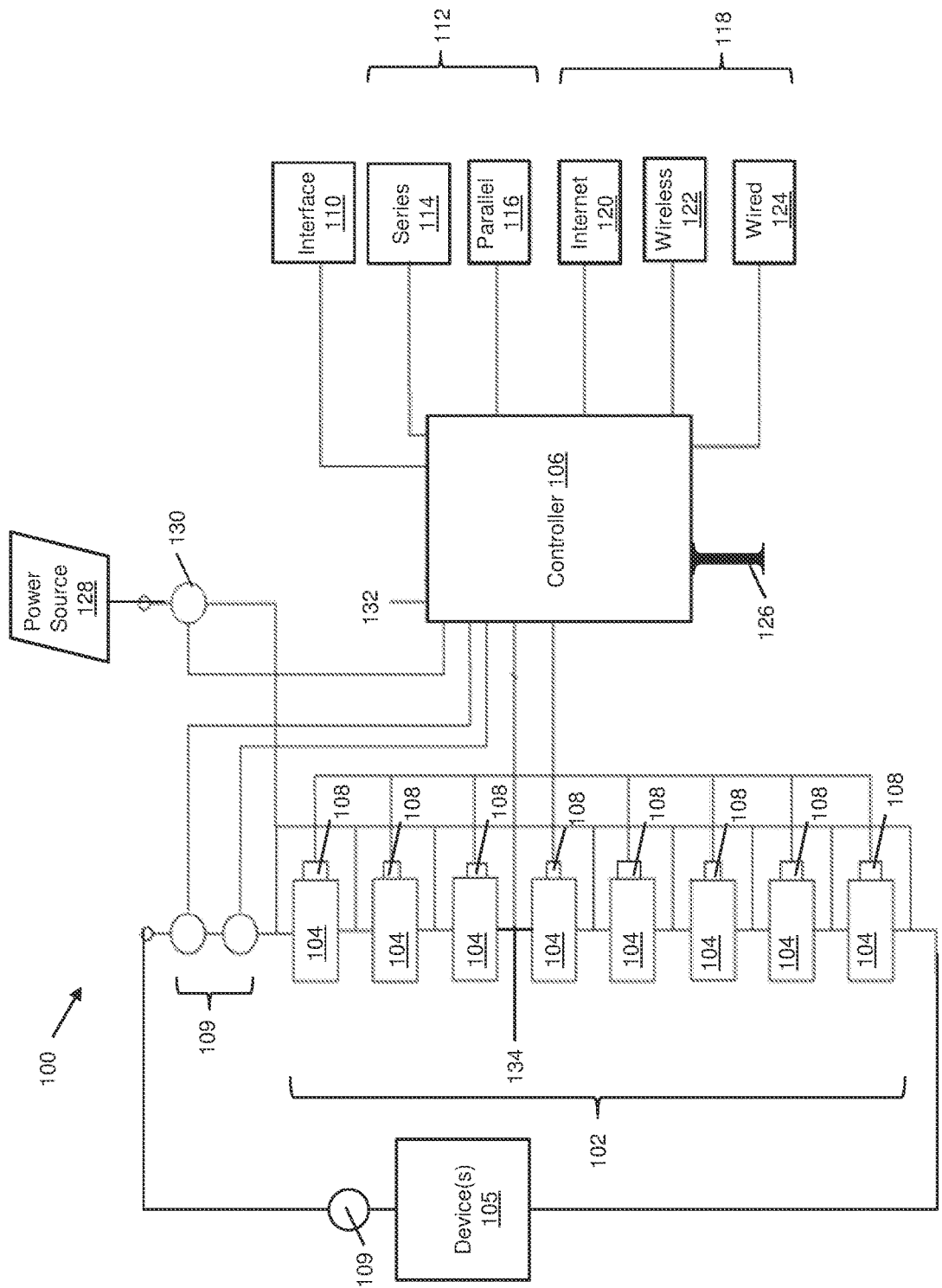
FIG. 1 shows a schematic view of a battery cell array electrically coupled to a controller of a battery management system (BMS) according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The disclosure provides an integrated Battery Management System (BMS) with multiple controllers for respective battery arrays, each of which may operate in active or passive modes to suit a variety of system architectures, device loads, schedules, etc. The BMS may provide an integrated system for controlling the operation of multiple battery arrays and/or cells within a given array. Such cells may include, e.g., lithium batteries and/or conventional rechargeable or non-rechargeable battery cells. Each controller in the BMS may be capable of monitoring one or more operating parameters of a respective battery array, e.g., voltage, current, charge, equalization and/or temperature. One technical effect of the BMS is to identify the presence of faulty cells in array based on relevant operating parameters. Embodiments of the disclosure differ from conventional battery management tools by designating one or more controllers to operate in an "active" mode, alternatively a "primary" or "network primary" mode, for receiving measured operating parameters for multiple arrays from other controllers, and analyzing whether the other arrays include a fault. Any controller operating in the active mode may be designated as a "first controller." The other controllers thus may operate in a "passive" mode, alternatively a "secondary" mode, where their operation is limited to measuring one or more operating parameters and transmitting the measured operating parameters to controller(s) operating in the active mode. Any controller operating in the passive mode may be designated as a "second controller." The designation of first controller and second controller specifically refers to each controller's present operating mode, and thus does not imply that the controllers feature differences in their hardware.

Embodiments of a BMS according to the disclosure, and related methods, are further operable to cease operation of one or more cells in an array (e.g., via controller(s) in the active mode) if one or more of these parameters fail to satisfy their predetermined threshold values (e.g., within arrange above minimum or below maximum allowable values). The BMS may allow other cells or battery cell arrays to continue operating notwithstanding a particular fault, and where possible may automatically adjust electrical connections between the battery array and devices electrically powered by the array. In this way, the BMS may compensate for temporary unavailability of one or more individual battery cells. In addition, the BMS may include related features for: networking with other battery arrays and devices; communication between the BMS and a user and/or remote software platform; equalization of power output across a device grid; software-based protection of cells within the array; and/or modularity for adapting each battery cell array the BMS unit to different applications.

Referring to FIG. 1, a schematic view of a battery management system (BMS) 100 is shown with an example battery cell array 102 (simply "array" hereafter, and alternatively known as a stack) of battery cells 104 according to embodiments of the disclosure. Array 102 of BMS 100 may be provided, e.g., as 2.5 kilowatt twenty-four volt DC pack, or any other currently-known or later developed battery cell array. Array 102 with cells 104 may be electrically coupled to one or more devices 105 (alternatively "load") to be powered by array 102. Device(s) 105 may include a single device requiring electrical power to operate, a grid of such devices, and/or any conceivable machine to be powered with array 102. During operation. BMS 100 is configured to operate a single array 102 in operation, or in conjunction with one or more additional array(s) 102 which may be part of or independent from BMS 100. Thus, BMS 100 is capable of operating with only a single array 102 without interacting with additional array(s) 102 and/or other BMS 100 units connected thereto. As discussed elsewhere herein. BMS 100 is capable of detecting when additional array(s) 102 and/or BMS 100 units are connected to, or disconnected from, BMS 100 and/or array 102 and thereafter changing the operating mode of BMS 100 or array 102.

BMS 100 may include a controller 106 (alternatively, "computing device") communicatively coupled to array 102 to perform various functions, including the monitoring of cells 104 of BMS 100 as described herein. Controller 106 can include any type of computing device capable of performing operations by way of a processing component (e.g., a microprocessor) and as examples can include a computer, computer processor, electric and/or digital circuit, and/or a similar component used for computing and processing electrical inputs. Example components and operative functions of controller 106 are discussed in detail elsewhere herein. Array 102 itself, and/or one or more cells 104 themselves in some instances, may also include an integrated circuit to communicate with and/or wirelessly transmit signals to controller 106. As shown, controller 106 may be directly electrically coupled to array(s) 102 and cell(s) 104 therein, such that controller 106 may control or otherwise influence the operation of array(s) 102 and/or cell(s) 104. In some cases, controller 106 may include or be coupled to switches controlling a junction between two array(s) 102 and/or cell(s) 104, thereby selectively allowing or prohibiting current flow between array(s) or cell(s) 104 of BMS 100.

Controller 106 may include, or otherwise be coupled to, various components for monitoring one or more operating parameters of array 102. According to an example, controller 106 may include or otherwise be coupled to a set of (i.e., one or more) transducers 108 for monitoring parameters such as, without limitation, voltage, current, charge, equalization and/or temperature. For these example properties, transducer(s) 108 may include one or more of a voltmeter, an ammeter, a thermometer, etc., for direct or indirect monitoring of the relevant operational parameter(s). Thus, BMS 100 may detect faults arising from under voltage and overvoltage of cell(s) 102 during operation of the system. BMS 100 similarly may detect various other physical parameters during operation and compare them with acceptable ranges. For example BMS 100 may measure one or more of the following properties for cell(s) 104 and/or array(s) where applicable: temperature, charge and discharge current, state of charge, cell voltage, coulomb counting, fault detection, etc. Controller 106 in combination with transducer(s) 108 also may provide passive equalization of array 102, e.g., adjusting each cell 104 within array 102 to yield a substantially equal electrical output as compared to other cells 104 and/or arrays 102 in BMS 100.

BMS 100 optionally may include at least one sensor 109, e.g., a Hall Effect current sensor, coupled to controller 106 for measuring parameters such as charge and discharge of array 102, each cell 104 thereof, and/or operating parameters of device(s) 105. Sensor(s) 109 may enable measuring, in isolation, charge and discharge currents within array 102 to determine compliance with various operating parameters. In the event of non-compliant operation, and as further described herein, controller 106 may trigger a full or partial shutdown of array 102 based on determining when the sensed charge and discharge currents violate one or more threshold values. Sensor(s) 109 may also include, e.g., one or more other sensors for directly or indirectly measuring operational parameters of array 102 based on other related variables.

Controller 106 may be operable to measure the operating parameter(s) of each array 102 and cell(s) 104 therein, and may be adjustable between operating in active and passive operating modes. Controller 106 may allow a user to control the amount of power supplied to device(s) 105 by array(s) 102 and/or cell(s) 104, and may cause BMS 100 to operate in an autonomous or semi-autonomous fashion. As examples, controller 106 by default may cause array(s) 102 and/or cell(s) 102 to operate in a state where each array 102 and cell 104 remains in an on state for supplying power to device(s) 105. Such operation may be governed by a general "on/off" switch coupled to controller 106. As discussed herein, a user interface 110 may include or otherwise provide an on/off switch for controlling whether BMS 100 supplies power to device(s) 105.

BMS 100 may additionally or alternatively operate using other operating profiles. For example, an "AutoRun" mode of controller 106 may include first examining array(s) 102 and/or cell(s) 104 for faults as described elsewhere herein, and thereafter automatically activating array(s) 102 if or when there are no faults detected during startup. A "timed mode" of controller 106 may automatically cause array(s) 102 and/or cell(s) 104 to cease operating after a predetermined time interval, at which point a user may adjust various settings and/or features of BMS 100 using controller 106. Similarly, a "dusk-to-dawn" mode may cause array(s) 102 and/or cell(s) 104 to activate and deactivate according to outside light intensity, as may be detected via a solar controller, charger expansion board, and/or other device coupled to controller 106. The dusk-to-dawn mode may additionally or alternatively enable and disable array(s) 102 and/or cell(s) 104 based on time intervals and/or specific times on a master clock within controller 106, without any external devices being necessary. A "user-driven mode" of controller 106 may cause array(s) 102 and/or cell(s) 104 to alternatively operate in load output and/or charging modes based on user-determined time periods or criteria, e.g., to maximize availability of power in certain deployments.

BMS 100 includes a user interface 110 to allow manual operation and monitoring of array(s) 102 of BMS 100 via controller 106. User interface 110 may take the form of, e.g., a keypad, touch screen, control panel, and/or one or more input/output (I/O) devices as described elsewhere herein. User interface 110 may be enabled, or otherwise provide an expanded operation, in cases where controller 106 operates in an active mode for a particular implementation of BMS 100. User interface 110 of BMS 100 may also provide a display-based interface. e.g., a time-based plot for visualizing various operational parameters to a user during operation of array 102. According to an example, the user interface 110 may include or be connected to a screen for displaying a bar-graph style display with RUN and RESET switches for basic operation. User interface 110 thus may be positioned proximate other I/O components, e.g., a keypad, touch screen interface, and/or other I/O component for allowing access and control over BMS 100.

As shown, BMS 100 may further include array networking components 112 for exchanging data with other controllers 106 in the same BMS 100, and as further described herein. Array networking components 112 may include, e.g., a series network 114 for exchanging data with controller(s) 106 for array(s) 102 electrically coupled in series with one array 102. Array networking components 112 may additionally or alternatively include a parallel network 116 for exchanging data with controller(s) 106 for array(s) 102 electrically coupled in parallel with one array 102. BMS 100 may further include external networking components 118 for interfacing with other systems, including another BMS 100 in some cases, via one or more currently known or later developed interfaces such as, e.g., Wi-Fi, USB, CAN-Bus and Ethernet connections. As examples, networking components 118 may include a wired or wireless internet connection 120, a local wireless connection 122, and/or a local wired connection 124. Such I/O components may allow the BMS 100 and cell stack to be monitored and controlled from a remote station, equipment or network compatible device. Any of the various networking components 112 described herein may be operable to automatically detect when another BMS 100 and/or array 102 is connected to, or disconnected from, BMS 100. Additionally, controller 106 of BMS 100 may be able to automatically shift between operating in an active mode or passive mode based on detecting an additional array 102 and/or BMS 100 being connected via network components 112. In an example, a BMS 100 and array 102 operating in isolation may operate in an active mode. However, upon detecting an additional BMS 100 and/or array 102 being coupled to the isolated BMS 100 or array 102, controller 106 may automatically shift to a passive mode to begin transmitting measured operational parameters to other controller(s) 106.

BMS 100 additionally may include an override switch 126 configured to disable array 102 and controller 106 from activating during specific circumstances. For example, the override switch 126 may be suitable to prevent operation while BMS 100, array 102, and/or controller 106 are in transit, in cases where a user may contact user interface 110 of controller 106, and/or in any other situation required for compliance with shipping regulations and/or other handling criteria. Override switch 126 may also be configured, e.g., to manually initiate an emergency shutdown of BMS 100. Override switch 126 additionally or alternatively may allow a user to override various operational settings of BMS 100 to shut down the entire system, including various interconnected arrays 102 and controllers 106, if an emergency occurs. Override switch 126 may also include, or otherwise be connected to, a motion detector such as an accelerometer. In this case, override switch 126 may be configured to detect motion of BMS 100 or various components thereof during operation. In the event of a physical shock, e.g., a vehicle crash, mechanical perturbation or change in position, etc., override switch 126 may automatically shut down at least a portion of BMS 100 upon detecting motion in excess of a predetermined threshold. Thresholds of detected motion may be defined, e.g., in controller 106 and/or other components of BMS 100 in communication with override switch 126.

BMS 100 may include, or be connected to, an external power source 128 for supplying power to controller 106 and/or charging cell(s) 104 in array 102. Although one external power source 128 is shown for the sake of example, it is understood that multiple and/or interchangeable devices for supplying power may be coupled to BMS 100. External power source 128 can include one or more of, e.g., an external battery, a solar panel, a wind turbine, a power plant, and/or an electrical grid which is further connected to various power sources. A charge relay 130 optionally may be configured to govern the passage of currents from external power source(s) 128 to controller 106 and/or array 102. Charge relay 130 may be particularly suitable for distinguishing between preferred and non-preferred sources of power, e.g., by prioritizing power from lower-cost or renewable sources before transmitting power from higher-cost or non-renewable sources.

Controller 106 and charge relay 130 may be operable to provide a variety of charging profiles for array 102 and its cells 104. For example, controller 106 may issue a "manual off" command to charge relay 130 which immediately disables any electrical inputs coupled to the "charge" node. Controller 106 may similarly issue a "manual on" command to charge relay 130 which enables charging inputs to array 102, with possible exceptions for fault conditions (e.g., overvoltage, equalization pause, etc.) as determined by controller 106 and discussed herein. Other modes for charge relay 130 may include, e.g., a "delta charge" mode which manually enables power equalization across cells 104 of array 102 during charging, to enable or disable charging inputs accordingly. A "conditional charging" mode of charge relay 130 may enable or disable charging of array 102 automatically in response to the chargeability of array 102. As used herein, the term "chargeability" refers to the amount of charge remaining in array 102 and/or cell(s) 104 as compared to a maximum amount of charge. According to an example, a low chargeability may refer to the charge capacity of array(s) 102 and/or cell(s) 104 falling below a particular threshold, e.g., remaining charge being below a set percentage such as fifty percent, twenty percent, etc. The conditional charging mode may also enable charging at one or more inputs upon the failure of power source(s) 128. e.g., unavailability of solar charging, wind charging, etc.

Controller 106 and/or charge relay 130 may include still further charging modes and/or settings for further customization. For example, controller 106 may include timer settings for adjusting a current time, date, timer, and time-dependent settings to create a charging schedule for array 102. Interface 110, networking components 112, and/or external networking components 118 may allow controller 106 to output current status reports and/or provide access for a user to control the unit via a remote device. Local wired connection 124 in particular unit may allow for charging of USB devices, or may provide a local access point for manipulation of applications and/or installing firmware updates for controller 106. A local wireless transceiver may be used to access a log of faults and review past operation of controller 106, e.g., via a remote device. An external controller and/or charger board may be coupled to controller 106 via networking components 112, 118 to provide additional charging for a cell array.

To implement a partial or complete shutdown of array(s) 102, controller(s) 106 may include a main output node 134 electrically coupled to cell(s) 104 for selectively enabling and disabling cell(s) 104. Main output node 134 thus may be the primary disruption device for disabling electrical loads in the event of a fault or manual reset. The driving circuit for main output node 134 may include, e.g., a logic catch that may be driven by software and/or other components within controller 106 and/or BMS 100, e.g., override switches and/or other devices. In still further implementations, main output node 134 may be electrically connected to other components of BMS 100 aside from array(s) 102, e.g., device 105, user interface 110, external power source 128, etc., and/or another BMS 100, to modify their operation where desirable or applicable.

Figure 2:
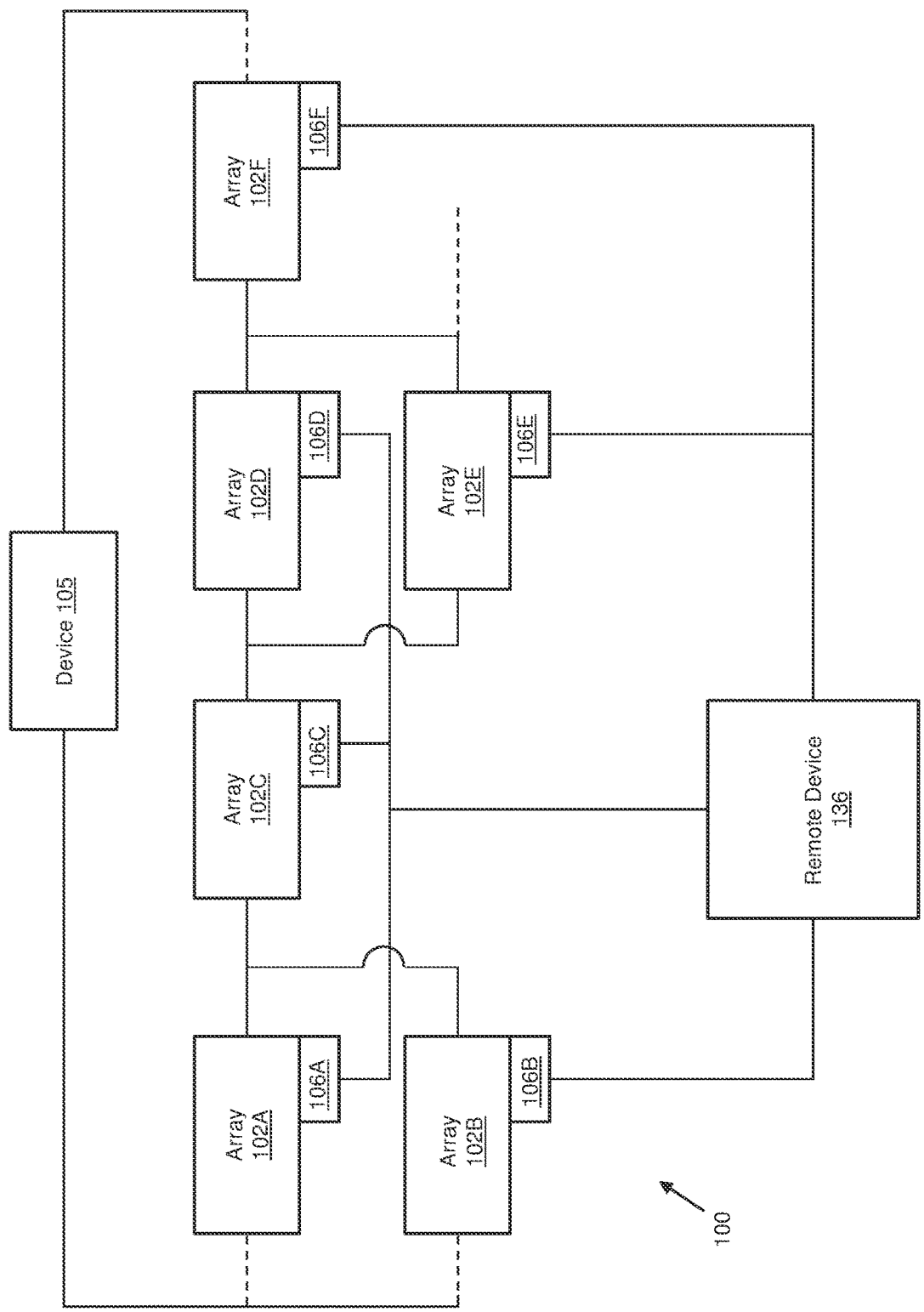
FIG. 2 shows a schematic view of a BMS with multiple battery cell arrays and controllers according to embodiments of the disclosure.

Referring now to FIGS. 1 and 2, BMS 100 may operate on multiple arrays 102 via multiple controllers 106 for monitoring each array 102. In FIG. 2, a schematic view of six arrays (separately identified as 102A, 102B, 102C, 102D, 102E, 102F) are shown together with six controllers (separately identified as 106A, 106B, 106C, 106D, 106E), each of which is coupled to one of the six arrays 102. Four arrays 102A, 102C, 102D, 102F are coupled together in series, while two other arrays 102B, 102E are coupled in parallel with other arrays 102. Arrays 102 are also shown to be electrically coupled to device 105 via the illustrative arrangement. It is understood that each of the various array(s) 102 may include different numbers of cell(s) 104, may feature different voltage outputs, and/or may even include cell(s) 104 with different battery chemistries despite being interconnected within a single BMS 100.

The coupling between arrays 102 is provided for the sake of example, and phantom lines are shown to indicate possible couplings to other arrays 102, devices 105, etc. However arranged, controllers 106 for multiple arrays 102 of BMS 100 may be capable of operating as a unitary battery system, regardless of whether arrays 102 are stacked and/or electrically coupled in series or parallel combinations. Networking components 112 (FIG. 1) may allow multiple arrays 102 and controllers 106 to operate as a single unit. In this configuration, controller(s) 106 may modify operation of one or more arrays 102 upon detecting a fault in any one array 102. To implement this feature, one or more controllers 106 may be selected to operate in an active mode. Any controllers 106 operating in the active mode may receive data for multiple arrays 102 from multiple controllers 106, and responsively cause one or more controllers 106 to control the operation of arrays 102. Thus, controller(s) 106 operating in an active mode are responsible for governing array(s) 102 as primary power sources for device(s) 105 during operation.

BMS 100 may include a remote device 136 (FIG. 2 only) for accessing, interacting with, and/or otherwise controlling controllers 106 of BMS 100. Remote device 136 itself may take the form of a controller (e.g., a master controller), computing device, remote control, other hardware for operating on and/or exchanging information with controllers 106 of BMS 100. In some cases, remote device 136 may be used to select which controller(s) 106 will operate in the active mode. In further examples, controller(s) 106 may be selectable between active and passive operating modes via I/O components included therein. A user, or software of remote device 136, may select a particular controller 106 to operate in the active mode depending on various criteria including. e.g., the position of array(s) 102 within BMS 100, an automatic or user-determined setting of BMS 100, reliability of one or more array(s) 102, and/or other criteria. During operation, any controller(s) 106 operating in the active mode may continuously identify operating parameters for arrays 102 currently included in BMS 100, operating parameters for arrays 102 newly coupled to BMS 100, send or receive data pertaining to each array 102, and control multiple array(s) 102 in response to various situations. An example of a situation may include detecting a fault condition, a "stop operation" order initiated via a user and/or software of controller(s) 106 or remote device(s) 136.

Figure 3:
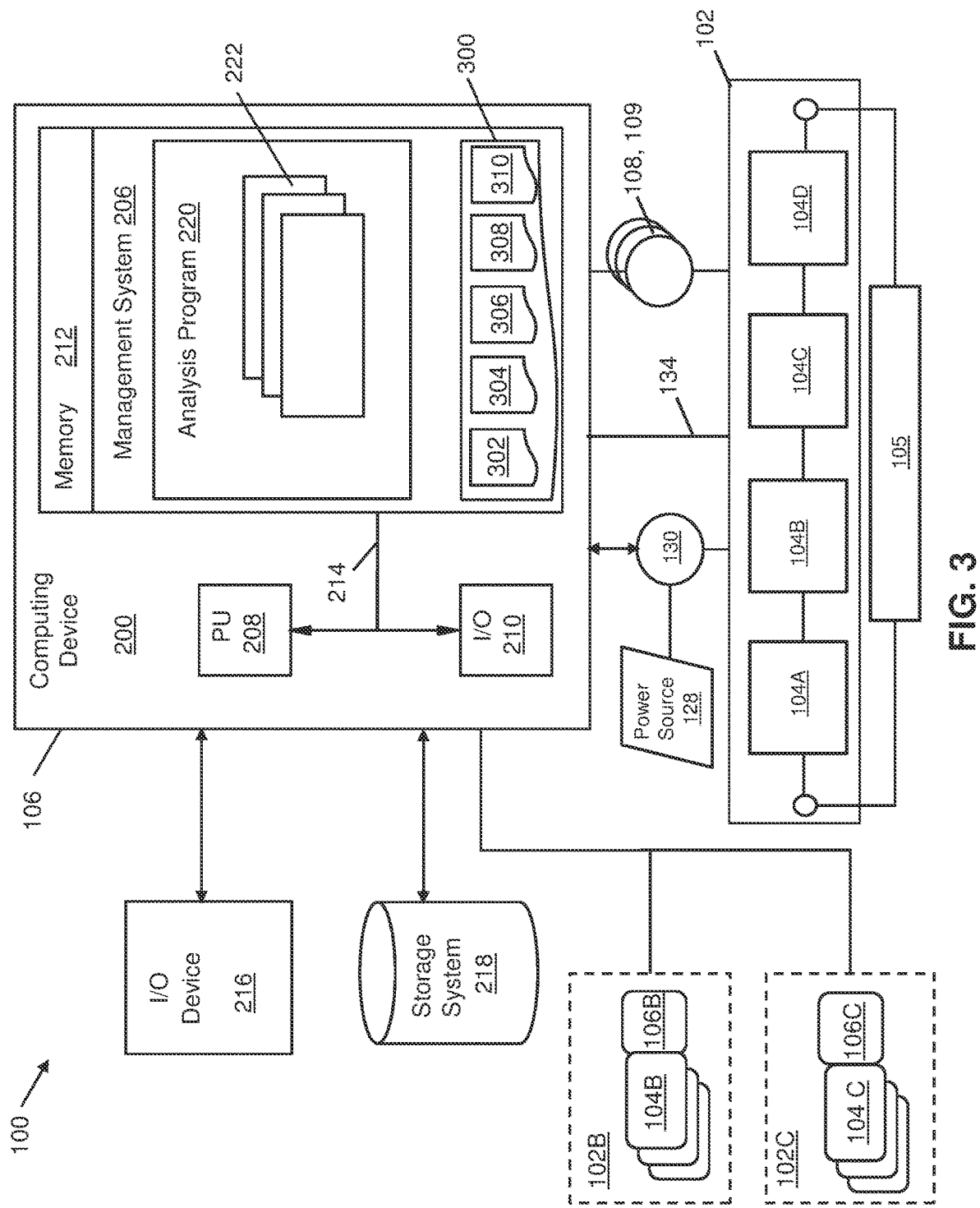
FIG. 3 shows an illustrative environment including a controller for implementing a BMS and related methods according to embodiments of the disclosure.

To further illustrate the operational features and details of BMS 100, an illustrative embodiment of controller 106 is discussed herein. Referring to FIG. 3, an example embodiment of BMS 100 and controller 106 and sub-components thereof is illustrated with a simplified depiction of arrays 102 and other components coupled thereto. In particular, BMS 100 can include controller 106, which in turn can include a management system 206. Controller 106 may include or otherwise take the form of a computing device 200 with various sub-components operable to perform functions as described herein. The configuration shown in FIG.

3 is one embodiment of a system for array(s) based on various physical properties, e.g., detected using transducer(s) 108 and/or sensor(s) 109. BMS 100 in some cases may be capable of interacting with multiple distinct sets of arrays 102.

As discussed herein, controller 106 can extract data obtained from transducers 108 and/or sensors 109 for measuring operating parameter(s) of array(s) 102 and/or cell(s) 104 during operation. Furthermore, embodiments of the present disclosure can operate automatically and/or responsive to user input by way of an application accessible to a user or other computing device. e.g., remote device 136 (FIG. 2). Such an application may, e.g., exclusively provide the functionality discussed herein and/or can combine embodiments of the present disclosure with a system, application, etc., for remotely array(s) 102. Embodiments of the present disclosure may be configured or operated in part by a technician, controller 106, and/or a combination of a technician and controller 106. It is understood that some of the various components shown in FIG. 3 can be implemented independently, combined, and/or stored in memory for one or more separate computing devices that are included in controller 106. Further, it is understood that some of the components and/or functionality may not be implemented, or additional schemas and/or functionality may be included as part of management system 206.

Controller 106 can include a processor unit (PU) 208, an input/output (I/O) interface 210, a memory 212, and a bus 214. Further, controller 106 is shown in communication with an external I/O device 216 and a storage system 218. I/O device 216 in some cases may include or be coupled to one or more of, e.g., user interface 110 (FIG. 1), series network 114 (FIG. 1), parallel network 116 (FIG. 1), internet connection 120 (FIG. 1), local wireless connection 122 (FIG. 1), and/or local wired connection 124 (FIG. 1) described elsewhere herein. Management system 206 can execute an analysis program 220, which in turn can include various software modules 222 configured to perform different actions. e.g., a calculator, a determinator, a comparator, an image processing algorithm, etc., The various modules 222 of management system 206 can use algorithm-based calculations, look up tables, and similar tools stored in memory 212 for processing, analyzing, and operating on data to perform their respective functions.

In general PU 208 can execute computer program code to run software, such as management system 206, which can be stored in memory 212 and/or storage system 218. While executing computer program code. PU 208 can read and/or write data to or from memory 212, storage system 218, and/or I/O interface 210. Bus 214 can provide a communications link between each of the components in controller 106. I/O device 216 can comprise any device that enables a user to interact with controller 106 or any device that enables controller 106 to communicate with the equipment described herein and/or other computing devices. I/O device 216 (including but not limited to keyboards, displays, pointing devices, etc.) can be coupled to controller 106 either directly or through intervening I/O controllers (not shown).

Memory 212 can also include various forms of data stored in a library 300 for quantifying one or more operational parameters of BMS 100, which may pertain to array(s) 102, cell(s) 104, and/or various components thereof. Controller 106 can monitor array(s) 102 by being directly coupled to one or more cell(s) 104 in array 102, as well as being communicatively coupled to other controller(s) 106 configured to monitor and adjust the operation of other array(s) 102. In any case, controller 106 may implement various operating steps which in turn can rely upon various forms of data in library 300. To exchange data between controller(s) 106, computing device 200 can be in communication with other controller(s) 106 through any currently known or later developed type of communications network. For example, network communication hardware of computing device 200 can be embedded at least partially within controller(s) 106 as a component thereof, or can be embodied as a remotely located device such as a tablet, PC, smartphone, etc., in communication with controller(s) 106 through any combination of wireless and/or wired communication protocols. To monitor power array(s) 102 and/or cell(s) 104, analysis program 220 of management system 206 can store and interact with library 300 according to processes of the present disclosure.

To provide scalability, each controller 106 may be paired with one array 102 of cells 104, e.g., at different locations. For example, two other arrays 102B, 102C in FIG. 3 are shown to have respective controllers 106B. 106C, both of which may be communicatively coupled to controller 106 via a communications network. While two other controllers 106B, 106C are shown to be in communication with controller 106, any conceivable number of additional arrays 102, cells 104, and/or controllers 106 is possible. In this manner, one controller 106 or combination of controllers 106 may act together or separately to manage one BMS 100, with each controller 106 being capable of operating in multiple modes (e.g., an active or passive mode as discussed herein). In some cases, controller(s) 106 being in communication with each other at multiple locations may allow BMS 100 to include machine learning features, e.g., using data obtained from array(s) 102 for powering different devices to inform or influence controller(s) 106 paired with another array 102.

Controller 106 may store operational parameter(s) of array(s) 102 in library 300 of memory 212. Library 300 can be organized into a group of fields. For example, library 300 may include a direct measurement field 302 for storing measurements directly obtained from array 102. e.g., via transducer(s) 108 and/or sensor(s) 109. Direct measurement field 302 can include relative and/or absolute values for one or more operational parameters of array(s) 102, e.g., voltage, current, temperature, remaining charge time, and/or any conceivable parameter capable of being measured and reported via transducer(s) 108 and/or sensor(s) 109 of the array(s) 102 being directly monitored with controller 106.

Other forms of library 300 may include, e.g., a received measurement field 304 for storing operational parameter(s) of other array(s) 102 that are not directly measured via transducer(s) 108, 109. For example, other controller(s) 106B. 106C may independently measure operational parameters of their respective array(s) 102B, 102C using their own set of transducers 108 and/or sensors 109. These measurements may be transmitted to controller 106 via a communications link, and stored in received measurement field 304. Each measurement field 302, 304, may be indexed via time and/or otherwise cross-referenced such that the same types of quantities and/or the same time periods may be compared against each other and/or various forms of reference data in library 300.

Library 300 in addition may include a device data field 306 for recording the characteristics of device 105, e.g., power demand levels, operating modes, and/or other types of data pertaining to the operation of device 105. Device data field 306 may be populated manually via a user of controller 106, by indirect measurement of array 102 and/or cell 104 behavior, and/or direct measurement of device(s)

105 via components therein such as transducers, sensors, etc. Device data field 306 may be organized into multiple fields including static data (e.g., device type, serial number, etc.) and dynamic data (e.g., current operating demand, historical and future operating demands, preferred battery types, etc.).

Library 300 may also include, e.g., an operating schedule field 308 for recording a predetermined or estimated operating schedule for array 102 and/or device 105. In some implementations as noted herein, device 105 may need to be operational over periods with varying electrical demand. It is possible for controller(s) 106 to vary the amount of power supplied to device(s) 105 for compliance and/or efficiency as the actual or expected demand varies. In a particular example, where device(s) 105 includes a power grid distributed over a particular area, the demand for power supplied from array(s) 102 may be greater during daytime hours than during night time hours. The actual or estimated operating schedules can be converted into reference data and stored in operating schedule field 308 of library 300 for reference by controller 106, e.g., when determining suitable times for supplying higher voltages, charging cell(s) 104, etc.

Operating schedule field 308 may be subdivided into operating schedules and/or settings that are specific to various battery chemistries, voltage outputs, etc. Thus, it is possible for a user to select or modify details of operating schedule field 308 to suit individual cell types, desired operating times, changing operating conditions, etc. During operation, modules 222 may use data in operating schedule field 308 to automatically determine when to activate or deactivate one or more arrays 102. The enabling or disabling of array 102 operation may be based on demand profiles in operating schedule field 308 for specific devices and/or applications. As non-limiting examples, such demand profiles may include "street light operation," "peak demand backup mode." "solar battery mode." "two-charger input mode," and/or other time-sensitive operating modes or charging applications.

A threshold field 310 can include one or more tolerance windows for determining whether any detected operating conditions (e.g., voltages, currents, temperatures, charge rates, remaining charge, etc.) stored in library 300 indicate that controller 106 must adjust the operation of array(s) 102 and/or cell(s) 104. More specifically, threshold field 310 may include operating data pertaining to past operation of BMS 100, specific arrays 102 and/or cells 104, and/or other relevant operating data pertaining to each component of BMS 100. In still further embodiments, threshold field 310 may additionally or alternatively include projected operating data for various array(s) 102 and/or cell(s) 104. In the case of projected operating data, modules 222 may use various forms of input data (e.g., past operation, selected operating settings, measurements from present operation, etc.) to predict future values of one or more operating parameters for each array 102 and/or cell 104. Threshold field 310 may be expressed as one or more sets of boundary values for operating parameters such as current, voltage, temperature, etc., for monitoring of various arrays 102 and/or cells 104 in BMS 100, including those measured directly by other controllers 106B, 106C and transmitted to controller 106. When operating in active mode, controller 106 may adjust array(s) 102 and/or cell(s) 104 based on any operating parameter, or combination of operating parameters, exceeding corresponding thresholds in threshold field 310. Each entry of fields 302, 304, 306, 308, 310 can be indexed relative to time such that a user can cross-reference information of each field 302, 304, 306, 308, 310 in library 300. It is also understood that library 300 can include other data fields and/or other types of data therein for evaluating the condition of array(s) 102, cell(s) 104, and/or other components of BMS 100.

Library 300 can also be subject to preliminary processing by modules 222 of analysis program 220 before being recorded in one or more of fields 302, 304, 306, 308, 310. For example, one or more modules 222 can apply a set of rules to remove erroneous or outlier readings from field(s) 302, 304, 306, filter inconsequential noise from digital signals encoding measurement data, etc. Such rules and/or other criteria may be generated from the manufacturer's manufacturing specification of device(s) 105, transducer(s) 108, sensor(s) 109, etc. Such analyses can determine criteria such as the limits of operating parameter(s) associated with data field 302, 304, 306, 308 being analyzed with respect to threshold field 310.

Controller 106 can comprise any general purpose computing article of manufacture for executing computer program code installed by a user (e.g., a personal computer, server, handheld device, etc.). However, it is understood that controller 106 is only representative of various possible equivalent computing devices that may perform the various process steps of the disclosure. In addition, controller 106 can be part of a larger system architecture operable to evaluate one or more array(s) 102 and their cell(s) 104.

To this extent, in other embodiments, controller 106 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, controller 106 may include a program product stored on a computer readable storage device, which can be operative to automatically monitor array(s) 102 and/or cell(s) 104 when executed.

Figure 4:
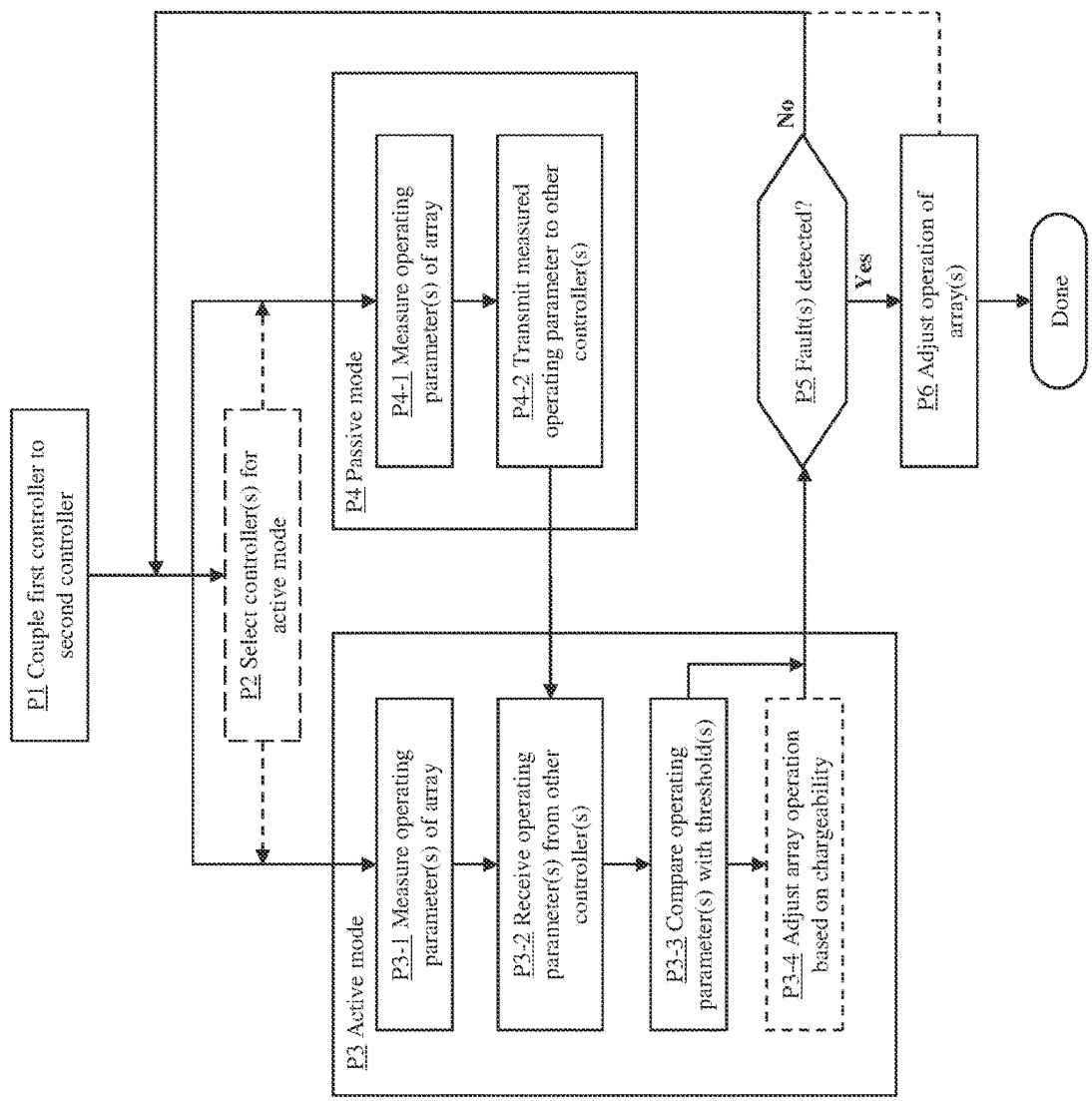
FIG. 4 provides an illustrative flow diagram of a method according to embodiments of the disclosure.

Referring to FIGS. 3 and 4, embodiments of the disclosure provide a method to provide and implement BMS 100 according to embodiments of the disclosure. BMS 100 is configured for only selected controllers 106, operating in the active mode, to compile measurements from multiple passive controllers 106 and detect the presence of a fault. e.g., arrays 102 and/or cells which do not conform to desired characteristics. Controllers 106 not operating in the active mode thus may simply measure operating parameter(s) of a single array 102 and transmit the measured operating parameter(s) to other controllers 106 for managing BMS 100. Controller(s) 106 need not operate solely in active or passive modes, and may vary their operating mode over time to suit varying circumstances, devices 105, and/or other needs.

In process P1, embodiments of the disclosure include coupling one controller 106 (a "first controller" hereafter for clarity) to another controller 106 (a "second controller" hereafter for clarity), each of which is connected to and configured to monitor a respective array 102 of cells 104. First and second controllers 106 may be similar or identical, and may be distinguished from each other solely based on their intended operation during methods according to the disclosure. According to an example, first controller 106 may be chosen to operate in an active operating mode while second controller 106 may be chosen to operate in a passive operating mode. Controller 106 of FIG. 3 may represent the first controller, while controller(s) 106B, 106C of FIG. 3 each may represent a second controller.

In some cases, neither controller 106 may be designated for operating in an active or passive mode at the time of coupling in process P1. In this case, the method may proceed to process P2 of selecting which controller(s) 106 will operate in an active mode or a passive mode. Controller(s) 106 operating in an active mode will measure operating parameter(s) of its respective array(s) 102. Controller(s) 106 in the active mode will also receive operating parameter(s) of array(s) 102 measured by controller(s) 106 operating in the passive mode. Only controller(s) 106 operating in the active mode will then evaluate whether various arrays 102 in BMS 100 are faulty and initiate further action based on the detected faults. Process P2 may include manually or automatically selecting controller(s) 106, e.g., via I/O device 216 and/or modules 222, to operate in active or passive modes. The selecting in process P2, in one example, may include module(s) 222 of analysis program 220 automatically selecting controller(s) 106 to operate in active or passive modes based on data in library 300. In one example, controller(s) 106 for monitoring array 102 with a history of reliable operation, as indicated in library 300, may be chosen automatically to operate in the active mode. Other controller(s) 106 for monitoring array(s) 102 with a history of unreliable operations, or newly added to BMS 100, as indicated in library 300, may be automatically chosen to operate in the passive mode. Regardless of the basis for selecting controllers 106 to operate in the active or passive mode, the method may continue to process P3 of operating controller(s) 106 in the active mode and process P4 of operating controller(s) 106 in the passive mode. Processes P3. P4 may be implemented substantially simultaneously, and some portions of process P3 may rely upon the outcome of process P4 as discussed elsewhere herein.

Controller(s) 106 operating in the active mode may implement process P3 to measure operational parameter(s) and detect faults via multiple sub-processes P3-1, P3-2, P3-3, and/or P3-4. The various sub-processes of process P3 may be implemented in a sequential and/or simultaneous manner, depending on user preference, BMS 100 under analysis, and/or parameters or variables. In sub-process P3-1, first controller(s) 106 may measure operating parameter(s) 106 of array 102 via transducer(s) 108, sensor(s) 109, and/or other components capable of measuring relevant operating parameters. The measured operating parameter(s) then may be stored in library 300 in direct measurement field 302. In sub-process P3-2, first controller(s) 106 may receive measured operating parameter(s) for other array(s) 102 from second controller(s) 106. The received operating parameters may be stored in received measurement field 304 of library 300.

Continuing to sub-process P3-3, the method may include comparing the operating parameter(s) of monitored array(s) 102 with corresponding thresholds, e.g., as specified in threshold data 310. In some cases, the inability to measure a voltage, current, and/or other operational parameter of one or more cell(s) 104 may yield a value of zero for the measured operating parameter, thereby indicating that a fault exists in array(s) 102. According to a further example, a comparator of modules 222 may compare measurement data in fields 302, 304, 306 with other data, e.g., schedule field 308 and/or threshold field 310, to detect fault(s) in array(s) 102 of BMS 100. In this case, a detected current in cell(s) 104 that exceeds a maximum current defined in threshold file 310 may indicate an electrical short within array(s) 102. The excessive current thus may indicate a faulty cell within array(s) 102. Similarly, other parameters such as voltages, temperatures, etc., may be compared with values in threshold data 310 to detect the presence of faults. Further processes according to the disclosure may include determining whether the measured value indicates a fault, and adjusting the operation of array(s) 102, e.g., by disabling faulty array(s) 102 and/or cell(s) 104 via first controller(s) 106 as described elsewhere herein.

Methods according to the disclosure may also include operating controller(s) 106 in a passive mode via process P4, which may be implemented simultaneously and/or sequentially with process P3 in embodiments of the disclosure. Process P4 may include sub-process P4-1, P4-2 configured for transmitting data for measured operating parameters to first controller 106 as it operates in the active mode. In process P4-1, second controller(s) 106 may measure operating parameter(s) of other array(s) 102 and cell(s) 104 to be analyzed by first controller 106. Thus. P4-1 may be substantially similar to the measuring operating parameter(s) by first controller(s) 106 in process P3-1. However, second controller(s) 106 will not undertake the additional step of analyzing the measured operating parameter(s). Instead, second controllers) 106 in process P4-2 will transmit the measured operating parameter(s) to first controller(s) 106. First controller(s) 106 may then store the transmitted measurement(s) in received measurement field 304. Thus, in the passive mode, second controller(s) 106 operate in a more limited capacity, e.g., solely be measuring operational parameter(s) of corresponding array(s) 102 and transmitting the data to other controller(s) 106. After processes P3, P4 conclude, the method may proceed to further processes for acting on BMS 100 based on detected faults.

After the comparison in process P3-3, the method may proceed to process P5 of determining whether one or more faults are detected in array(s) 102. Process P5 may include, e.g., a determinator of modules 222 determining whether a prior comparison between measured operating parameter(s) and their thresholds in threshold field 310 indicate a fault. Where a fault is not detected (i.e., "No." at process P5), the method may return to processes P2. P3, and/or P4 of continuing to operate controller(s) 106 in active and passive modes to continue looking for faults. Where a fault is detected (i.e., "Yes" at process P6), the method may continue to process P6 of adjusting the operation of one or more arrays 102. The adjusting in process P6 may be implemented directly via first controller(s) 106, e.g., by interacting with the respective array(s) 102 and/or by causing second controller(s) 106 to adjust the operation of its respective array 102. In a specific example, process P6 may include disabling one or more array(s) 102 and/or individual cells where the detected fault appears. In still further examples, the modification may include increasing or reducing a power output of array(s) 102 where faults have appeared, enabling or disabling an electrical coupling between serially-coupled or parallel-coupled arrays 102, etc. Other embodiments of process P6 may include, e.g., adjusting each array 102 and/or cell 104, e.g., using controller 106, to bring them into compliance with a desired operating schedule, e.g., as specified in scheduling field 308. In still further examples, process P6 may include storing the detected faults in library 300, e.g., to provide a running catalogue of faults detected in BMS 100 for future reference. Thereafter, the method may conclude ("Done"), or optionally return to process(es) P2. P3. P4 of re-selecting active and passive controller(s) 106 and/or repeating processes(s) P3, P4, including their respective sub-processes.

Figure 5:
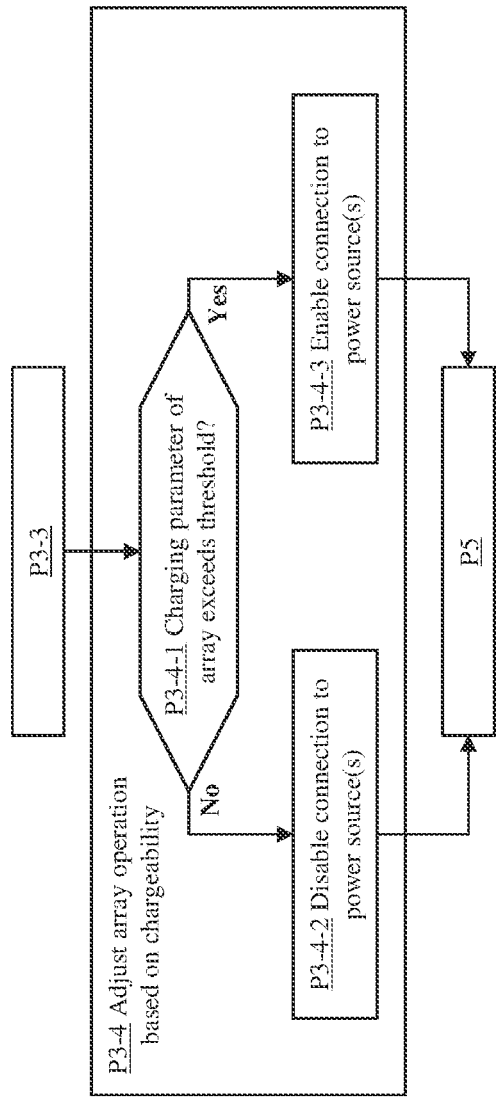
FIG. 5 provides an illustrative flow diagram of a subprocess to adjust the operation of a battery cell array based on chargeability in embodiments of the disclosure.

Referring briefly to FIGS. 3 and 5, process P3 of operating first controller 106 in the active mode may include additional sub-processes to control whether array(s) 102 and/or cell(s) 104 will begin or cease charging. More generally, embodiments of the disclosure are operable to analyze the chargeability of each array 102 and/or cell 104. i.e., the amount of remaining charge as compared to maximum charge capacity. In embodiments where process P3-4 occurs, controller 106 may determine whether to begin or cease charging array(s) 104 based on their remaining battery life. The various sub-processes P3-4-1, P3-4-2. P3-4-3 together may identify whether selected array(s) 102 and/or cell(s) 104 are particularly in need of additional charging from a power source of BMS 100, e.g., external power source(s) 124 described elsewhere herein. In sub-process P3-4-1, a comparator of modules 222 may determine whether a charging parameter, e.g., an amount of charge remaining in array(s) 102 and/or cell(s) 104, exceeds a threshold value. In the example of remaining charge, such a threshold may be exceeded when the remaining charge of array(s) 102 and/or cell(s) 104 drops below a minimum charge threshold. Thus, "exceeding" a threshold in process P3-4-1 may include one or more parameters being greater than a threshold value, less than a threshold value, and/or within or outside a range of threshold values. The threshold value may be stored. e.g., in threshold data 310 of library 300. In cases where the charging parameter does not exceed the relevant chargeability threshold(s) (i.e., "No" at process P3-4-1), the method may proceed to process P3-4-2 of disabling an electrical connection between array(s) 102 and one or more power sources via controller(s) 106. The disabling in process P3-4-3 thus may ensure that available power is not used for charging array(s) 102 that do not require further charging. In cases where the charging parameter does exceed the relevant chargeability threshold(s) (i.e., "Yes" at process P3-4-1), the method may proceed to process P3-4-3 of enabling an electrical connection between array(s) 102 and one or more power sources via controller(s) 106. In cases where some array(s) 102 exceed the chargeability threshold but others do not, sub-processes P3-4-2 and P3-4-3 may be implemented simultaneously and/or in parallel with each other. In any case, the method may continue to process P5 of adjusting the operation of array(s) 102 after sub-process P3-4 concludes.

Embodiments of the disclosure provide various technical and commercial advantages, some of which are discussed by example herein. As compared to conventional battery management systems, the disclosure provides a modular set of distinct controllers each paired with a particular array. Rather than attempting to unify control over a battery network through one specially-programmed computer system, the disclosure uses a network of smaller-scale interconnected controllers to collect operational data from multiple devices. During operation, power consumption by the battery management system is minimized by operating only selected controllers in the active mode to manage or modify the operation of other battery arrays in the same network. Embodiments of the disclosure provide various other advantages and features. e.g., the ability to operate according to a predetermined schedule, ease of adding or subtracting devices from the network, the ability to quickly change which controllers operate between active and passive monitoring modes, etc. It is understood that various other embodiments of the disclosure may provide still further advantages aside from those discussed explicitly herein.

The terminology used herein is for the purpose of describing particular embodiments only and is not intended to be limiting of the disclosure. As used herein, the singular forms "a," "an." and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A battery management system (BMS) comprising:
   a plurality of controllers including one or more designated primary controllers operating in an active mode and one or more designated secondary controllers operating in a passive mode, the one or more designated primary controllers configured to:
      measure an operating parameter of a first battery cell array directly coupled to the one or more designated primary controllers, and
      receive a measured operating parameter of one or more second battery cell arrays from one or more designated secondary controllers of the plurality of controllers, detect a fault in the one or more second battery cell arrays based upon the measured operating parameters thereof, and adjust an operation of the one or more second battery cell arrays,
   wherein in the passive mode, the one or more designated secondary controllers transmit the measured operating parameter of the second battery cell array to the one or more designated primary controllers;
   a motion detector; and
   an override switch connected to the motion detector and configured to:
      detect motion of the BMS; and
      shut down at least a portion of the BMS in response to the detected motion being in excess of a predetermined threshold.

2. The BMS of claim 1, wherein the first battery cell array has a different battery chemistry than at least one of the second battery cell arrays.

3. The BMS of claim 1, wherein the each designated primary controller in the active mode configured to:
   determine whether a charging parameter of the first battery cell array or the one or more second battery cell arrays exceed a chargeability threshold indicative of an acceptable remaining charge of the first battery cell array or the one or more second battery cell arrays;
   enable an electrical connection between the first battery cell array or the one or more second battery cell arrays and a power source in response to the charging parameter exceeding the chargeability threshold; and
   disable an electrical connection between the first battery cell array or the one or more second battery cell arrays and the power source in response to the charging parameter not exceeding the chargeability threshold.

4. The BMS of claim 1, wherein the each designated primary controller in the active mode further adjusts a power output of the first battery cell array and the one or more second battery cell arrays based on a predetermined operating schedule.

5. The BMS of claim 1, wherein at least one controller of the plurality of controllers has a defined predetermined threshold for the detected motion.

6. The BMS of claim 1, further comprising:
   light intensity detecting device coupled to each controller and configured to detect outside light intensity,
   wherein each controller being configured to activate or deactivate the first battery cell array that is directly connected thereto according to the detected outside light intensity.

7. The BMS of claim 1, further comprising a charge relay coupled to the first battery cell array and an external power source, wherein:
the first battery cell array includes charging inputs coupled to the charge relay; and
each controller having the first battery cell array directly connected thereto configured to command the charge relay to enable charging, with power from the power source, the first battery cell array, except if the fault was detected.

8. The BMS of claim 7, further comprising the external power source, wherein the power source includes a renewable power source.

9. The BMS of claim 7, further comprising external power sources comprising a renewable power source and non-renewable power source,
wherein the charge relay configured to prioritize power from the renewable power sources to charge the first battery cell array.

10. A method comprising:
by a designated primary controller of a plurality of controllers of a battery management system (BMS):
monitoring a first battery cell array directly coupled to the designated primary controller,
measuring an operating parameter of the first battery cell array during the monitoring,
receiving a measurement of an operating parameter of a second battery cell array directly coupled to a secondary controller of the plurality of controllers,
detecting a fault within the second battery cell array based on the operating parameter of the first and second battery cell arrays, and
adjusting an operation of the second battery cell array, in response to detecting the fault; and
detecting motion of the BMS, by a motion detector; and
shutting down at least a portion of the BMS in response to the detected motion being in excess of a predetermined threshold.

11. The method of claim 10, further comprising causing the designated primary controller to perform actions including:
determining whether a charging parameter of the first battery cell array or the second battery cell array exceeds a chargeability threshold indicative of an acceptable remaining charge of the first battery cell array or the second battery cell array;
enabling an electrical connection between the first battery cell array or the second battery cell array and a power source in response to the charging parameter exceeding the chargeability threshold; and
disabling an electrical connection between the first battery cell array or the second battery cell array and the power source in response to the charging parameter not exceeding the chargeability threshold.

12. The method of claim 10, further comprising causing the designated primary controller further to adjust a power output of the first and second battery cell arrays based on a predetermined operating schedule.

13. The method of claim 10, wherein at least one controller of the plurality of controllers has a defined predetermined threshold for the detected motion.

14. The method of claim 10, further comprising:
detecting outside light intensity by a light intensity detecting device coupled to the designated primary controller; and
activating or deactivating the first battery cell array according to the detected outside light intensity.

15. The method of claim 10, further comprising:
relaying a charge from an external power source, by a charge relay coupled to the first battery cell array and the external power source, wherein the first battery cell array includes charging inputs coupled to the charge relay;
by the designated primary controller directly connected to the first battery cell array, commanding the charge relay to enable charging, with power from the power source, the first battery cell array; and
charging the first battery cell array with the power from the power source.

16. The method of claim 15, wherein the external power source includes a renewable power source.

17. The method of claim 15, wherein the BSM includes the external power sources comprising a renewable power source and non-renewable power source, and
the method further comprising:
by the charge relay, prioritizing power from the renewable power sources to charge the first battery cell array.

18. A battery management system (BMS) comprising:
a plurality of controllers including one or more designated primary controllers operating in an active mode and one or more designated secondary controllers operating in a passive mode, the one or more designated primary controllers configured to:
measure an operating parameter of a first battery cell array directly coupled to the one or more designated primary controllers; and
receive a measured operating parameter of one or more second battery cell arrays from one or more designated secondary controllers of the plurality of controllers, detect a fault in the one or more second battery cell arrays based upon the measured operating parameters thereof, and adjust an operation of the one or more second battery cell arrays,
wherein in the passive mode, the one or more designated secondary controllers transmit the measured operating parameter of the second battery cell array to the one or more designated primary controllers; and
light intensity detecting device coupled to each controller of the plurality of controllers and configured to detect outside light intensity,
wherein each controller of the plurality of controllers being configured to activate or deactivate the first battery cell array that is directly connected thereto according to the detected outside light intensity.

19. The BMS of claim 18, further comprising:
a motion detector; and
an override switch connected to the motion detector and configured to:
detect motion of the BMS; and
shut down at least a portion of the BMS in response to the detected motion being in excess of a predetermined threshold.

20. A method comprising:
by a designated primary controller of a plurality of controllers of a battery management system (BMS):
monitoring a first battery cell array directly coupled to the designated primary controller,
measuring an operating parameter of the first battery cell array during the monitoring,
receiving a measurement of an operating parameter of a second battery cell array directly coupled to a secondary controller of the plurality of controllers, detecting a fault within the second battery cell array based on the operating parameter of the first and second battery cell arrays, and adjusting an operation of the second battery cell array, in response to detecting the fault;

detecting outside light intensity by a light intensity detecting device coupled to the designated primary controller; and activating or deactivating the first battery cell array according to the detected outside light intensity.

* * * * *